US011072685B2

(12) United States Patent
Schiraldi et al.

(10) Patent No.: US 11,072,685 B2
(45) Date of Patent: Jul. 27, 2021

(54) FIBER REINFORCED TEREPHTHALATE-CO-4,4'-BIBENZOATE COPOLYESTER

(71) Applicants: ExxonMobil Chemical Patents Inc., Baytown, TX (US); Case Western Reserve University, Cleveland, OH (US)

(72) Inventors: David A. Schiraldi, Shaker Heights, OH (US); Hua Sun, Cleveland Heights, OH (US); Yong Yang, Kingwood, TX (US)

(73) Assignees: ExxonMobil Chemical Patents Inc, Baytown, TX (US); Case Western Reserve University, Cleveland, OH (US)

( * ) Notice: Subject to any disclaimer, the term of this patent is extended or adjusted under 35 U.S.C. 154(b) by 0 days.

(21) Appl. No.: 16/263,048

(22) Filed: Jan. 31, 2019

(65) Prior Publication Data

US 2019/0233580 A1   Aug. 1, 2019

Related U.S. Application Data

(60) Provisional application No. 62/624,540, filed on Jan. 31, 2018.

(51) Int. Cl.
| | |
|---|---|
| *C08G 63/185* | (2006.01) |
| *C08J 5/04* | (2006.01) |
| *C08L 67/02* | (2006.01) |
| *B29K 309/08* | (2006.01) |
| *B29C 45/00* | (2006.01) |
| *B29K 67/00* | (2006.01) |

(52) U.S. Cl.
CPC ............ *C08G 63/185* (2013.01); *C08J 5/043* (2013.01); *C08L 67/02* (2013.01); *B29C 45/0001* (2013.01); *B29K 2067/003* (2013.01); *B29K 2309/08* (2013.01); *C08G 2250/00* (2013.01); *C08J 2367/02* (2013.01)

(58) Field of Classification Search
None
See application file for complete search history.

(56) References Cited

U.S. PATENT DOCUMENTS

| | | | |
|---|---|---|---|
| 4,025,492 A | 5/1977 | Binsack et al. | |
| 4,082,731 A | 4/1978 | Knopka | |
| 4,093,603 A | 6/1978 | Jackson, Jr. et al. | |
| 4,136,089 A | 1/1979 | Bier et al. | |
| 4,140,670 A | 2/1979 | Charles et al. | |
| 4,176,224 A | 11/1979 | Bier et al. | |
| 4,208,527 A | 6/1980 | Horlbeck et al. | |
| 4,238,593 A | 12/1980 | Duh | |
| 4,914,179 A | 4/1990 | Morris et al. | |
| 4,990,549 A | 2/1991 | Delvin et al. | |
| 5,026,760 A * | 6/1991 | Liu | C08L 67/02 524/449 |
| 5,519,094 A * | 5/1996 | Tseng | C08L 67/02 525/440.01 |
| 5,681,918 A | 10/1997 | Adams et al. | |
| 6,034,163 A | 3/2000 | Barbee et al. | |
| 2017/0247527 A1* | 8/2017 | Oda | C08K 7/00 |

FOREIGN PATENT DOCUMENTS

| | | | | |
|---|---|---|---|---|
| WO | WO-0127200 A2 * | 4/2001 | | C08L 67/02 |
| WO | 2017112031 | 6/2017 | | |
| WO | WO-2017112031 A1 * | 6/2017 | | C08G 63/183 |

OTHER PUBLICATIONS

Jung et al. "High resolution microscopic investigation of frustrated packing of a semiflexible liquid crystalline polyester", Macromolecules (1998), 31(3), 637-643. (Year: 1998).*
Jansson (1992) Applications of LCP Materials. In:Collyer A.A. (eds) Liquid Crystal Polymers: From Structures to Applications. Polymer Liquid Crystal Series, vol. 1. Springer, Dordrecht, https://doi.org/10.1007/978-94-011-1870-5_8 (Year: 1992).*
MacDonald (1992) Thermotropic Main Chain Liquid Crystal Polymers. In:Collyer A.A. (eds) Liquid Crystal Polymers: From Structures to Applications. Polymer Liquid Crystal Series, vol. 1. Springer, Dordrecht, https://doi.org/10.1007/978-94-011-1870-5_8. (Year: 1992).*
Jansson (1992) Applications of LCP Materials. In:Collyer A.A. (eds) Liquid Crystal Polymers: From Structures to Applications. Polymer Liquid Crystal Series, vol. 1. Springer, Dordrecht (Year: 1992).*
MacDonald (1992) Thermotropic Main Chain Liquid Crystal Polymers. In:Collyer A.A. (eds) Liquid Crystal Polymers: From Structures to Applications. Polymer Liquid Crystal Series, vol. 1. Springer, Dordrecht (Year: 1992).*
Schiraldi, D.A. et al.; Mechanical Properties and Atomic Force Microscopic Cross Sectional Analysis of Injection Molded Poly(ethylene perephthalate-co-4,4'-bibenzoate); J. Ind. Eng. Chem., vol. 7, No. 2 (2001) 67-71.
Schiraldi, D.A. et al.; Atomic Force Microscopy (AFM) Study of Poly(ethylene terephthalate-co-4, 4'-bibenzoate): A Polymer of Intermediate Structure; Journal of Applied Polymer Science, vol. 82, 2616-2623 (2001).
Ma, Hongming et al.; Fiber Spinning, Structure, and Properties of Poly(ethylene terephthalate-co-4,4'-bibenzoate) Copolyesters; Macromolecules 2002,35, 5123-5130.
Ku, H. et al.; A review on the tensile properties of natural fiber reinforced polymer composites; Composites: Part B 42 (2011) 856-873.
DiBenedetto, A.T.; Tailoring of interfaces in glass fiver reinforced polymer composites: a review; Materials and Science Engineering A302 (2001) 74-82.

(Continued)

*Primary Examiner* — Nicole M. Buie-Hatcher
(74) *Attorney, Agent, or Firm* — Daniel N. Lundeen; Lundeen & Lundeen PLLC

(57) ABSTRACT

Fiber-reinforced terephthalate-co-4,4'-bibenzoate copolyester behaves like a liquid crystalline polymer, providing fast crystallization, short cycling times, high $T_g$ and $T_m$, high strength and stiffness, while the viscosity is unexpectedly reduced at a low fiber loading ratio. In an injection molding process, the viscosity of the fiber reinforced copolyester at low fiber loading is reduced by increasing the fiber loading.

23 Claims, 4 Drawing Sheets

(56) References Cited

OTHER PUBLICATIONS

Bassett, B.R. and Yee, A.F.; A Method of Forming Composite Structures Using in Situ-Formed Liquid Crystal Polymer Fibers in a Thermoplastic Matrix; Polymer Composites, Feb. 1990, vol. 11, No. 1.

Ophir, Zohar and Ide, Yoshiaki; Injection Molding of Thermotropic Liquid Crystal Polymers; Polymer Engineering and Science, Mid-Oct. 1983, vol. 23, No. 14, 792-796.

Weng, T, et al.; Failure Processes in Fiber-Reinforced Liquid-Crystalline Polyester Composites; J. Macromol. Sci.-Chem., A23(1), pp. 273-307 (1989).

S.C. Sherman, A.V. Iretskii, M.G. White, D.A. Schiraldi, Dimethylbiphenyls from toluene, Chem. innovation 30 (7) (2000) 25-30.

A. Polyakova, R. Liu, D. Schiraldi, A. Hiltner, E. Baer, Oxygen-barrier properties of copolymers based on ethylene tefephlhalate, J. Polym. Sci., Part B: Polym. Phys. 39 (16) (2001) 1889-1899.

Liu, A. Hiltner, E. Baer, Free volume and oxygen transport in cold-drawn R. Liu, A. Hiltner, E Baer, Free volume and oxygen transport in cold-drawn polyesters, J. Poym. Sci., Part B: Polym. Phys. 43 (3) (2004) 493-504.

W. Krigbaum, J. Asrar, H. Toriumi, A. Ciferri, J. Preston, Aromatic polyesters forming thermotropic smectic mesophases, J. Polym. Sci. C Polym. Lett. 20 (20) (1982) 109-115.

D. Frenkel, Order through entropy, Nat. Mater. 14 (1) (2015) 9-12.

Eliot H. Edling, et al. Copolyesters based on bibenzoic acids. Polymer, Jan. 17, 2018, vol. 135, pp. 120-130.

Sun, Hua et al., Unfrustration of a frustrated liquid crystalline polymer, Polymer, Oct. 23, 2018, vol. 158, pp. 59-64.

Krigbaum,WR et al., Aromatic Poyesters Forming Thermotropic Smectic Mesophases, J. Polym. Sci., Polym. Lett. 1982, 20, 109.

S. D. Cohen, C. A. Risinger Diuguid, J. C. Poirier & J. K. Swadesh (1981) Synthesis and Thermal Analysis of Fourteen Homologous Mesogenic Monoesters of Biphenyl-4,4'-dicarboxylic Acid, Molecular Crystals and Liquid Crystals, 78:1, 135-155, DOI: 10.1080/00268948108082152.

Krigbaum, W. R. et al., A Polyester Forming a Thermotropic Cholesteric Phase, Mol. Cryst. Lig. Cryst. 1981, 76, 79.

\* cited by examiner

FIBER REINFORCED TEREPHTHALATE-CO-4,4'-BIBENZOATE COPOLYESTER

PRIORITY CLAIM

This application claims the benefit of and priority to U.S. Ser. No. 62/624,540, filed Jan. 31, 2018, which is incorporated by reference in its entirety.

FIELD OF THE INVENTION

The present invention relates to fiber reinforced polyesters, and in particular to glass reinforced terephthalate-co-bibenzoate copolyester.

BACKGROUND

Polyesters, as the third largest selling polymer in the plastic material market, could be used in many different applications such as containers for water and soft drink, fibers for textiles, and so on. Polybutylene terephthalate (PBT) is the most commonly used thermoplastic polyester for injection molding applications. PBT has more chain mobility, and thus can be more effectively crystallized than polyethylene terephthalate (PET). The relatively rapid crystallization rate of PBT offers shorter cycling time and higher productivity in injection molding applications.

In contrast, PET has less chain mobility and as a result, a higher glass transition temperature ($T_g$), melting temperature ($T_m$), and better strength and stiffness performance at both room and elevated temperatures. PET is engineered to prevent crystallization and has been used as a preform followed by blow molding to bottles. The low crystallization rate of PET is problematic in injection molding, however, requiring a colder mold temperature and longer cycle time, and often results in defects such as variable shrinkage, dimensional stability, and clarity. The chain stiffness in PET also leads to different thermal and mechanical properties.

Composites bond different materials together to develop desired mechanical properties. Fiber reinforced plastic (FRP) composite has enhanced strength and elasticity. However, fiber reinforcement is known to greatly increase the melt viscosity of the polyester, and makes processing difficult.

Thermotropic liquid crystalline polymers, like Vectra® polyester, can align and orient in the flow direction under shear when processed during injection molding or extrusion. At the same time, the mechanical, shrinkage, and other properties of liquid crystalline polymers are highly influenced by molecular orientation. Due to the fountain flow effect, however, the molecule at the surface is more stretched following flow direction than the center of the part away from the surface of the mold, and forms a highly oriented skin layer. The skin layer normally contains around 15-30% of the total thickness.

The industry thus has a need for a polyester with similar or faster crystallization rates than PBT for improved processability in general and injection molding applications in particular, but with thermal properties similar to or better than PET and without the defects of injection molded PET and thick skin layers seen with liquid crystalline polymers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with embodiments of the invention, a fiber-reinforced plastic comprises a copolyester comprising a diol component, and a diacid component comprising terephthalate and 4,4'-biphenyl dicarboxylate, and a fiber reinforcing agent.

In accordance with embodiments of the invention, a shaped article comprises injection molded fiber-reinforced plastic comprising a copolyester comprising a diol component, and a diacid component comprising terephthalate and 4,4'-biphenyl dicarboxylate, and a fiber reinforcing agent.

In accordance with embodiments of the invention, a method comprises melt processing, preferably injection molding, a fiber-reinforced plastic comprising a copolyester comprising a diol component, and a diacid component comprising terephthalate and 4,4'-biphenyl dicarboxylate, and a fiber reinforcing agent.

In accordance with embodiments of the invention, a method to control viscosity, storage modulus, notched Izod impact strength, and/or heat deflection temperature comprises: melt processing, preferably injection molding, a fiber-reinforced plastic comprising a copolyester comprising a diol component, and a diacid component comprising terephthalate and 4,4'-biphenyl dicarboxylate, and a fiber reinforcing agent; and selecting a proportion of the fiber reinforcing agent to obtain one or more of a desired viscosity, storage modulus, notched Izod impact strength, and/or heat deflection temperature. In the following discussion, reference is made to poly(ethylene terephthalate-co-4,4'-biphenyl dicarboxylate) (PETBB) by way of example where ethylene glycol is representative of suitable diol component(s).

DETAILED DESCRIPTION

Figure 1:
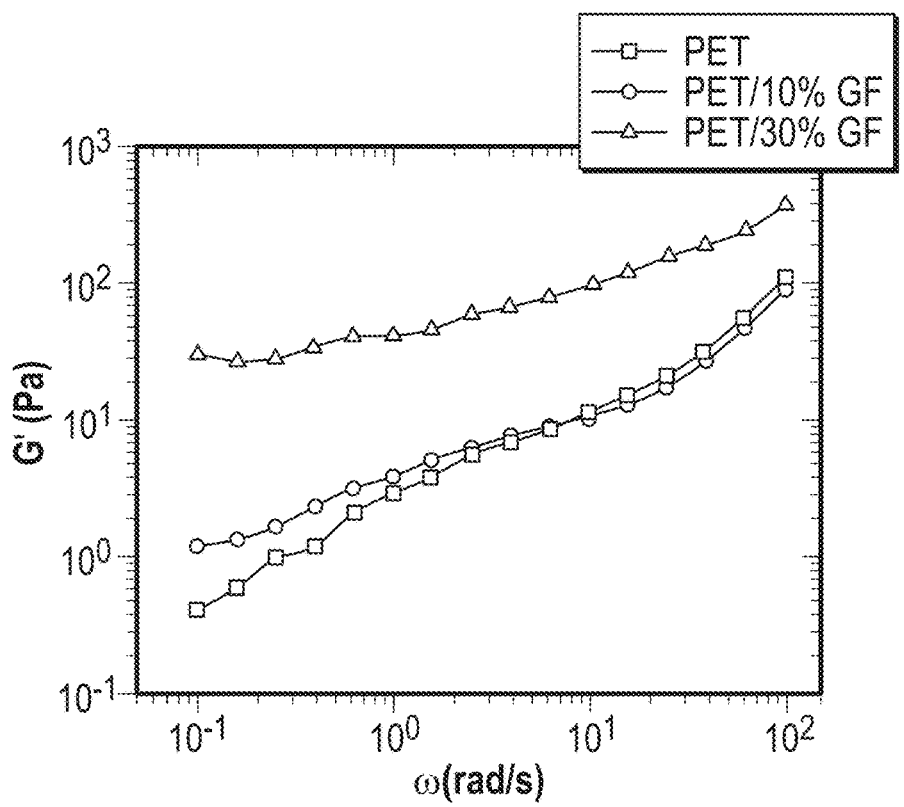
FIG. 1 is a graph of the storage modulus (G') of polyethylene terephthalate (PET) and fiber reinforced PET.

Throughout the entire specification, including the claims, the following terms shall have the indicated meanings.

The term "and/or" refers to both the inclusive "and" case and the exclusive "or" case. Such term is used herein for brevity. For example, a composition comprising "A and/or B" may comprise A alone, B alone, or both A and B.

The percentages of monomers are expressed herein as mole percent (mol %) based on the total moles of monomers present in the reference polymer or polymer component. All other percentages are expressed as weight percent (wt %), based on the total weight of the particular composition present, unless otherwise noted. Room temperature is 25° C. 2° C. and atmospheric pressure is 101.325 kPa unless otherwise noted.

The term "consisting essentially of" in reference to a composition is understood to mean that the composition can include additional compounds other than those specified, in such amounts to the extent that they do not substantially interfere with the essential function of the composition, or if no essential function is indicated, in any amount up to 5 percent by weight of the composition.

For purposes herein a "polymer" refers to a compound having two or more "mer" units (see below for polyester mer units), that is, a degree of polymerization of two or more, where the mer units can be of the same or different species. A "homopolymer" is a polymer having mer units or residues that are the same species. A "copolymer" is a polymer having two or more different species of mer units or residues. "Different" in reference to mer unit species indicates that the mer units differ from each other by at least one atom or are different isomerically. Unless otherwise indicated, reference to a polymer herein includes a copolymer, a terpolymer, or any polymer comprising a plurality of the same or different species of repeating units.

The term "polyester", as used herein, refers to a polymer comprised of residues derived from one or more polyfunctional acid moieties, collectively referred to herein as the "diacid component", in ester linkage with residues derived from one or more polyhydroxyl compounds, which may also be referred to herein as "polyols" and collectively as the "diol component". The term "repeating unit", also referred to as the "mer" units, as used herein with reference to polyesters refers to an organic structure having a diacid component residue and a diol component residue bonded through a carbonyloxy group, i.e., an ester linkage. Reference to the equivalent terms "copolyesters" or "(co)polyesters" or "polyester copolymers" herein is to be understood to mean a polymer prepared by the reaction of two or more different diacid compounds or ester producing equivalents thereof that incorporate different diacid residues into the backbone, and/or two or more different diol compounds that incorporate different diol residues into the backbone, i.e., either one or both of the diacid and diol components incorporate a combination of different species into the polymer backbone.

As used herein, the prefixes di- and tri- generally refer to two and three, respectively, with the exception of diacid and diol components noted herein. Similarly, the prefix "poly-" generally refers to two or more, and the prefix "multi-" to three or more. The carboxylic acids and/or esters used to make the copolyesters, or the residues of which are present therein, are collectively referred to herein as the "diacid component", including both difunctional and multifunctional species thereof, or simply as the "acid component"; and likewise the hydroxyl compounds used to make the copolyesters, or the residues of which are present therein, are collectively referred to herein as the "diol component", including both difunctional and multifunctional species thereof, or simply as the hydroxyl or polyol component.

The polycarboxylic acid residues, e.g., the dicarboxylate mer units, may be derived from a polyfunctional acid monomer or an ester producing equivalent thereof. Examples of ester producing equivalents of polyfunctional acids include one or more corresponding acid halide(s), ester(s), salts, the anhydride, or mixtures thereof. As used herein, therefore, the term "diacid" is intended to include polycarboxylic acids and any derivative of a polycarboxylic acid, including its associated acid halides, esters, half-esters, salts, half-salts, anhydrides, mixed anhydrides, or mixtures thereof, capable of forming esters useful in a reaction process with a diol to make polyesters.

The term "residue," as used herein, means the organic structure of the monomer in its as-polymerized form as incorporated into a polymer, e.g., through a polycondensation and/or an esterification or transesterification reaction from the corresponding monomer. Throughout the specification and claims, reference to the monomer(s) in the polymer is understood to mean the corresponding as-polymerized form or residue of the respective monomer. For purposes herein, it is to be understood that by reference to a copolyester comprising a diacid component and a diol component, the diacid and diol components are present in the polymer in the as-polymerized (as-condensed) form. For example, the diacid component is present in the polymer as dicarboxylate in alternating ester linkage with the diol component, yet the polyester may be described as being comprised of, for example, the dicarboxylic acid alkyl ester and diol, where it is understood the alkyl ester groups in the starting material are not present in the polyester. For example, the diacid component is present in the polymer in alternating ester linkage with the diol component, yet the polyester may be described as being comprised of, for example, the dicarboxylic acid or dicarboxylic acid alkyl ester and diol, e.g., terephthalic acid-ethylene glycol polyester or dimethyl terephthalate-ethylene glycol polyester, where it is understood the acid or methyl ester groups in the starting material are not present in the polyester.

In any embodiment, two of the diacid and/or diol groups can be present in the finished polymer as the ends of the polymer chains, though the methyl ester groups may not be present at chain ends in any measurable concentrations.

Mole percentages of the diacid and diol components are expressed herein based on the total moles of the respective component, i.e., the copolyesters comprise 100 mole percent of the polyfunctional acid component and 100 mole percent of the polyfunctional hydroxyl component. Mole percentages of a branching agent are based on the total moles of repeating (ester-linked diacid-diol) units.

For purposes herein, the melting temperature, crystallization temperature, glass transition temperature, etc., are determined by DSC analysis from the second heating ramp by heating of the sample at 10° C./min from 0° C. to 300° C. The melting, crystallization, and glass transition temperatures are measured as the midpoint of the respective endotherm or exotherm in the second heating ramp.

Unless indicated otherwise, inherent viscosity (IV) is determined in 0.5% (g/dL) dichloroacetic acid solution at 25° C. by means of a CANNON TYPE B glass capillary viscometer, adapted from ASTM method D4603. Inherent viscosity at 0.5 g/dL dichloroacetic acid solution was used to calculate intrinsic viscosity according to the method outlined in Ma et al., "Fiber Spinning, Structure, and Properties of Poly(ethylene terephthalate-co-4,4'-bibenzoate) Copolyesters", *Macromolecules,* 2002, 35, 5123-5130. Inherent viscosity ($\eta_{inh}$) is calculated as the ratio of the natural logarithm of the relative viscosity to the mass concentration of the polymer according to the equation (A):

$$\eta_{inh} = \frac{\ln \eta_{rel}}{c}, \quad (A)$$

where c is the mass concentration of the polymer (g/dL) and $\eta_{rel}$ is the relative viscosity, which is determined according to the equation (B)

$$\eta_{rel} = \frac{\eta}{\eta_0}, \quad (B)$$

where $\eta$ is the viscosity of the solution and $\eta_0$ is the viscosity of the neat solvent. Unless otherwise specified, inherent viscosity is expressed as dL/g.

It is to be understood that for purposes herein, a polymer referred to as a "bibenzoate" (BB) comprises a diacid component comprising residues derived from a biphenyl dicarboxylic acid or ester producing equivalent thereof, such as, for example, 4,4'-biphenyl dicarboxylic acid or ester producing equivalent thereof. The terms "biphenyl dicarboxylate" and "bibenzoate" are equivalent and may be used interchangeably herein.

The difunctional hydroxyl compound can be a dihydric alcohol such as, for example, glycols and diols. The term "glycol" as used in this application includes, but is not limited to, diols, glycols, and/or multifunctional hydroxyl compounds. In any embodiment, the difunctional hydroxyl compound may be an alicyclic or aromatic nucleus bearing 2 hydroxyl substituents such as, for example, 1,4-cyclohexanedimethanol, hydroquinone, or the like.

For purposes herein, a polymer is "frustrated" when the tendencies, e.g., Van der Waals forces, steric hindrance, entropy, etc., which compete in the stability of some material do not succeed in building complete order at the molecular level because of geometrical impossibilities. By way of example and not limitation, liquid crystalline polymers may be frustrated by the presence of comonomers that sterically hinder chain packing from completely orienting.

The following abbreviations are used herein: ASTM is ASTM International, formerly the American Society for Testing and Materials; BB is 4,4'-bibenzoate; DSC is differential scanning calorimetry; E is ethylene; EG is ethylene glycol; FRP is fiber-reinforced plastic; GF is glass fiber; GPC is gel permeation chromatograph; HDT is heat distortion temperature; NPG is neopentyl glycol, 2,2-dimethyl-1, 3-propanediol; PBT is polybutylene terephthalate; PET is polyethylene terephthalate; PETBB is poly(ethylene terephthalate-co-4,4'-bibenzoate); SEM is scanning electron microscopy; TGA is thermogravimetric analysis.

In any embodiment of the invention, a fiber-reinforced plastic composition comprises a polyester comprising a diol component comprising an alkylene glycol, and a diacid component comprising terephthalate and 4,4'-biphenyl dicarboxylate, and a fiber reinforcing agent. The diol component preferably comprises, consists essentially of, or consists of ethylene glycol. The diacid component preferably comprises, consists essentially of, or consists of from 10 to 90 mole percent terephthalate and from 90 to 10 mole percent 4,4'-biphenyldicarboxylate, preferably wherein the diacid component comprises from 15 to 75 mole percent terephthalate and from 85 to 25 mole percent 4,4'-biphenyldicarboxylate, preferably wherein the diacid component comprises from 20 to 70 mole percent terephthalate and from 80 to 30 mole percent 4,4'-biphenyldicarboxylate, preferably wherein the diacid component comprises from 25 to 65 mole percent terephthalate and from 75 to 35 mole percent 4,4'-biphenyldicarboxylate, preferably wherein the diacid component comprises from 30 to 60 mole percent terephthalate and from 70 to 40 mole percent 4,4'-biphenyldicarboxylate, preferably wherein the diacid component comprises from 35 to 55 mole percent terephthalate and from 65 to 45 mole percent 4,4'-biphenyldicarboxylate, preferably wherein the sum of the mole percents of terephthalate and 4,4'-biphenyldicarboxylate totals 100.

The diacid component may comprise another diacid or ester producing equivalent thereof, preferably an aromatic diacid or ester producing equivalent thereof, preferably 3,4'-biphenyl dicarboxylate, preferably wherein the other diacid or ester producing equivalent thereof is present in an amount less than 10 mole percent, or less than 5 mole percent, or less than 1 mole percent, or less than 0.1 mole percent, based on the total moles in the diacid component.

The fiber reinforcing agent is preferably selected from mineral fiber, polymer fiber, or a combination thereof. The fiber reinforcing agent preferably comprises glass fiber. The fiber reinforcing agent is preferably present in a proportion of from 0.1 to 60 percent by weight of the composition, preferably in a proportion of from 1 to 50 percent by weight of the composition, preferably in a proportion of from 5 to 35 percent by weight of the composition, preferably in a proportion of from 5 up to 20 or up to less than 20 percent by weight of the composition, preferably in a proportion of from 5 to 15 percent by weight of the composition, preferably in a proportion of from 10 to 30 or from 15 to 30 percent by weight of the composition. The fiber reinforcing agent preferably comprises short fiber having an aspect ratio greater than 6 and less than 1000, preferably greater than 10, preferably greater than 20, preferably greater than 100, preferably greater than 200, preferably greater than 300. Or, the fiber reinforcing agent preferably comprises long fiber having an aspect ratio greater than 1000.

The polyester preferably comprises a frustrated liquid crystalline polymer.

Polyesters in any embodiment herein may be prepared from a diacid component and a diol component, which react in substantially equal molar proportions and are incorporated into the polyester polymer as their corresponding residues. The polyesters useful in the present invention may contain oligomers of the diol component and/or the diacid component, e.g., at the chain ends where one of the diol and diacid components is in excess. Preferably the copolyesters contain substantially equal molar proportions of acid residues (100 mol %) and diol residues (100 mol %) such that the total moles of repeating units are equal to 100 mole percent. The mole percentages provided in the present invention, therefore, may be based on the total moles of acid residues, the total moles of diol residues, or the total moles of repeating units, unless otherwise indicated.

In any embodiment according to the invention, a copolyester, which may be referred to simply as the "polymer" or the "bibenzoate polymer" for brevity, comprises two or more bibenzoate isomers, e.g., equal to or greater than about 1 mole percent 4,4'-biphenyl dicarboxylic acid (derived from the diacid or ester producing equivalent thereof) and equal to or greater than about 1 mole percent 3,4'-biphenyl dicarboxylic acid (derived from the diacid or ester producing equivalent thereof) in combination with the diol component. In any embodiment, the diacid component of the copolyester consists essentially of 4,4'-biphenyl dicarboxylic acid and 3,4'-biphenyl dicarboxylic acid.

In any embodiment, the diacid component of the copolyester comprises a lower limit for 4,4'-BB selected from about 5, or 10, or 20, or 30, or 35, or 40, or 45, or 50 mole percent, based on the total moles of the diacid component; up to any higher limit of about 99, or 90, or 85, or 75, or 70, or 65, or 60 mole percent, preferably with the balance of the diacid component being terephthalate (T). For example, the diacid component may comprise from about 10 to 90 mole percent 4,4'-BB, and from about 90 to 10 mole percent terephthalate; or from about 20 to 80 mole percent 4,4'-BB, and from about 80 to 20 mole percent terephthalate; or from about 30 to 80 mole percent 4,4'-BB, and from about 70 to 20 mole percent terephthalate; or from about 40 to 90 mole percent 4,4'-BB, and from about 60 to 10 mole percent terephthalate; or from about 45 to 70 mole percent 4,4'-BB, and from about 55 to 30 mole percent terephthalate; or the like; all based on the total moles in the diacid component. Preferably, 4,4'-BB is at least 40 mole percent of the diacid component and terephthalate is at least 10 mole percent of the diacid component, based on the total moles of the diacid component. Preferably, the mole percentages of 4,4'-BB and terephthalate in the diacid component total 100 percent.

In any embodiment, the diacid component in the copolyester may comprise additional polyfunctional acids in amounts as desired, such as, for example, from about 0.1 to 10 mole percent, preferably 0.1 to 5 mole percent or less than 1 mole percent, of one or more of 3,4'-bibenzoate, isophthalate, phthalate, naphthalate, e.g., 1,5-naphthalenedicarboxylate, 2,6-naphthalenedicarboxylate, or 2,7-naphthalenedicarboxylate, or the like, derived from the corresponding acids, esters or any ester producing equivalents thereof.

In any embodiment of the invention, the diol component comprises aliphatic polyols, especially alkylene diols, having 2 to 20 carbon atoms (preferably from 2 to 10 or from 2 to 5 carbon atoms), alicyclic polyols having 3 to 20 carbon atoms, aromatic polyols having 6 to 20 carbon atoms, and so on, where any diol component constituent may be present in the copolyester, for example, in an amount equal to or greater than about 1 mole percent, based on the total moles of the diol component in the copolyester. In any embodiment, the diol component comprises ethylene glycol, neopentylglycol, 1,2-propanediol, 1,3-propanediol, 1,4-butanediol, 1,5-pentanediol, 1,6-hexanediol, isosorbide, isoidide, isomannide, 1,3-cyclohexanedimethanol, 1,4-cyclohexanedimethanol, p-xylene glycol, or a combination thereof. Preferably, the diol component comprises, consists essentially of, or consists of ethylene glycol.

Preferably, the polymer comprises an inherent viscosity equal to or greater than about 0.5 dL/g, or equal to or greater than 0.7 dL/g, or equal to or greater than 0.8 dL/g; or equal to or greater than 0.9 dL/g; or equal to or greater than 1.0 dL/g; or equal to or greater than 1.1 dL/g; measured at a temperature of 25° C. in dichloroacetic acid.

In any embodiment of the invention, the polymer may exhibit a thermal decomposition temperature equal to or greater than 350° C., preferably equal to or greater than 360° C., or equal to or greater than 370° C., e.g., from 370° C. to 380° C., or about 375° C., determined at 5 percent weight loss from thermogravimetric analysis (TGA).

The composite in any embodiment may comprise a fiber reinforcing agent, preferably in an amount from 1 wt % to 50 wt %, or from 2 wt % to 40 wt %, or from 2 wt % to 20 wt %, or from 10 wt % to 30 wt %, based on the weight of the composite. The fiber reinforcing agent may comprise fiber, preferably short fiber, i.e., having an aspect ratio defined by the ratio of the length to the diameter of the fiber, less than 1000, preferably less than 500. These fibers preferably have a circular cross section. The fiber is preferably unidirectional, and preferably free flowing.

The fiber in any embodiment may be selected from mineral fiber, polymeric fiber, or a combination of mineral and polymeric fiber. The fiber preferably has a melting temperature and/or a glass transition temperature greater than the melting temperature of the PETBB copolyester, or preferably greater than a processing temperature of the PETBB copolyester.

As mineral fiber there may be mentioned carbon fiber, which includes fiber of nanotubes or carbon nanotubes (CNTs), carbon nanofiber or graphenes; silica fiber, such as glass fiber, in particular of E, E-CR, R or S type; boron fiber; ceramic fiber, in particular silicon carbide fiber, boron carbide fiber, boron carbonitride fiber, silicon nitride fiber, boron nitride fiber, basalt fiber; fibers or filaments based on metals and/or alloys thereof, fibers of metal oxides, in particular of alumina ($Al_2O_3$); metalized fiber, such as metalized glass fiber and metalized carbon fiber, or mixtures of the abovementioned fibers. As polymeric fiber, there may be mentioned thermosetting polymers, thermoplastic polymers, polyamides, aramids, polyamide block copolymers, and so on. Preferably, the fiber reinforcing agent comprises glass fiber, due to its low cost, high tensile strength, chemical resistance, and electrical insulation. The invention is discussed herein in reference to glass fiber (GF) by way of example and illustration, not as a limitation.

The PETBB/GF composite preferably exhibits a semicrystalline morphology. In any embodiment, the PETBB/GF composite may exhibit a glass transition temperature equal to or greater than about 80° C., preferably equal to or greater than about 85° C., equal to or greater than about 90° C., or equal to or greater than about 95° C., or equal to or greater than about 100° C., or equal to or greater than about 105° C., determined by DSC analysis from a second heating ramp at a heating rate of 10° C./min. In any embodiment, the PETBB/GF composite may exhibit a cold crystallization temperature equal to or less than about 130° C., preferably equal to or less than about 125° C., equal to or less than about 120° C., or equal to or less than about 118° C., determined by DSC analysis from a second heating ramp at a heating rate of 10° C./min.

The PETBB/GF composite is preferably a frustrated liquid crystalline polymer. In any embodiment, the PETBB/GF composite may exhibit an enthalpy of cold crystallization equal to or less than about 15 J/g, preferably equal to or less than about 10 J/g, equal to or less than about 5 J/g, or equal to or less than about 2 J/g, or equal to or less than about 1 J/g, determined by DSC analysis from a second heating ramp at a heating rate of 10° C./min. In any embodiment, the PETBB/GF composite may exhibit an enthalpy of melting equal to or less than about 30 J/g, preferably equal to or less than about 25 J/g, or equal to or less than about 20 J/g, determined by DSC analysis from a second heating ramp at a heating rate of 10° C./min. In any embodiment, the PETBB/GF composite may exhibit a difference between the enthalpies of cold crystallization and melting is equal to or greater than about 10 J/g, preferably equal to or greater than about 15 J/g, or equal to or greater than about 20 J/g, determined by DSC analysis from a second heating ramp at a heating rate of 10° C./min.

Preferably, the PETBB/GF composite exhibits a melting temperature $T_m$ of about 240° C. to 260° C., e.g., about 245° C. to 255° C., or about 250° C., determined by DSC analysis from a second heating ramp at a heating rate of 10° C./min.

In any embodiment, the PETBB/GF composite may exhibit one or more or all of the following tensile properties:

Tensile modulus of equal to or greater than about 1500 MPa, preferably equal to or greater than about 2000 MPa, or greater than or equal to 2500 MPa, determined according to ASTM D638;

Strength at break of equal to or greater than about 60 MPa, preferably equal to or greater than about 80 MPa, or equal to or greater than about 85 MPa, determined according to ASTM D638;

Strain at break of equal to or less than about 10 percent, e.g., from 5 to 10 percent, determined according to ASTM D638; and Ultimate strength of equal to or greater than about 60 MPa, preferably equal to or greater than about 80 MPa, or equal to or greater than about 85 MPa, determined according to ASTM D638.

In any embodiment, the PETBB/GF composite may exhibit one or more or all of the following flexural properties:

Flexural modulus of equal to or greater than about 2500 MPa, preferably equal to or greater than about 3000 MPa, or greater than or equal to 4000 MPa, determined according to ASTM D790;

Strength at break of equal to or greater than about 80 MPa, preferably equal to or greater than about 90 MPa, or equal to or greater than about 100 MPa, determined according to ASTM D790; and Strain at break of equal to or greater than about 2%, preferably equal to or greater than about 3%, determined according to ASTM D790.

In any embodiment, the PETBB/GF composite may exhibit an improved heat distortion temperature (HDT), which is the temperature at which a sample deforms under a specified load of 455 kPa or 1.82 MPa, determined according to ASTM D648. Preferably, the composite exhibits an HDT (455 kPa) of at least 65° C., or at least 70° C., or at least 75° C., or at least 80° C., or at least 100° C., or at least 140° C., or at least 160° C.; and/or an HDT (1.82 MPa) of at least 65° C., or at least 70° C., or at least 75° C., or at least 80° C., or at least 85° C., or at least 90° C., or at least 95° C.

According to another aspect, a method for molding a fiber-reinforced polyester comprises melt processing a polyester composition comprising a diol component, preferably comprising an alkylene glycol, and a diacid component comprising terephthalate and 4,4'-biphenyl dicarboxylate, and a fiber reinforcing agent; and forming the resulting composite in the shape of a mold.

The diol component in the method preferably comprises, consists essentially of, or consists of ethylene glycol.

The diacid component in the method preferably comprises, consists essentially of, or consists of from 10 to 90 mole percent terephthalate and from 90 to 10 mole percent 4,4'-biphenyldicarboxylate, preferably wherein the diacid component comprises from 15 to 75 mole percent terephthalate and from 85 to 25 mole percent 4,4'-biphenyldicarboxylate, preferably wherein the diacid component comprises from 20 to 70 mole percent terephthalate and from 80 to 30 mole percent 4,4'-biphenyldicarboxylate, preferably wherein the diacid component comprises from 25 to 65 mole percent terephthalate and from 75 to 35 mole percent 4,4'-biphenyldicarboxylate, preferably wherein the diacid component comprises from 30 to 60 mole percent terephthalate and from 70 to 40 mole percent 4,4'-biphenyldicarboxylate, preferably wherein the diacid component comprises from 35 to 55 mole percent terephthalate and from 65 to 45 mole percent 4,4'-biphenyldicarboxylate, preferably wherein the sum of the mole percents of terephthalate and 4,4'-biphenyldicarboxylate totals 100.

The method preferably comprises injection molding, including gas-assisted injection molding. The method preferably comprises removing the shaped composite from the mold. The method preferably comprises adjusting the proportion of the fiber reinforcing agent to control the melt viscosity, crystallization characteristics, and/or mechanical properties.

In another aspect, the invention provides, a method to control the viscosity, crystallization characteristics, and/or mechanical properties of a copolyester, comprising: melt processing a polyester composition comprising a diol component comprising an alkylene glycol; and a diacid component comprising terephthalate and 4,4'-biphenyl dicarboxylate; and a fiber reinforcing agent; forming the resulting composite in the shape of a mold; and selecting a proportion of the fiber reinforcing agent to adjust the viscosity, crystallization characteristics, and/or mechanical properties of the composite.

The invention also relates to a composite produced according to any of the methods described herein.

In any embodiment of the invention, the copolyesters may be prepared by melt polymerization techniques including transesterification and polycondensation, in batch, semi-batch or continuous processes. The copolyesters are preferably prepared in a reactor equipped with a stirrer, an inert gas (e.g., nitrogen) inlet, a thermocouple, a distillation column connected to a water-cooled condenser, a water separator and a vacuum connection tube. Any of the equipment and procedures disclosed in U.S. Pat. Nos. 4,093,603 and 5,681,918, incorporated by reference herein, may be adapted for implementation herein.

In any embodiment of the invention, polycondensation processes may include melt phase processes conducted with the introduction of an inert gas stream, such as nitrogen, to shift the equilibrium and advance to high molecular weight and/or vacuum melt phase polycondensation at temperatures above about 150° C. and pressures below about 130 Pa (1 mm Hg). The esterification conditions can preferably include an esterification catalyst, such as, for example, sulfuric acid, a sulfonic acid, and so on, preferably in an amount from about 0.05 to 1.50 percent by weight of the reactants; optional stabilizers, such as, for example, phenolic antioxidants such as IRGANOX 1010 or phosphonite- and phosphite-type stabilizers such as tributylphosphite, preferably in an amount from 0 to 1 percent by weight of the reactants; a temperature which is gradually increased from about 130° C. in the initial reaction steps up to about 190 to 280° C. in the later steps, initially under normal pressure, then, when necessary, under reduced pressure at the end of each step, while maintaining these operating conditions until a copolyester with the desired properties is obtained. If desired, the degree of esterification may be monitored by measuring the amount of water formed and the properties of the copolyester, for example, viscosity, hydroxyl number, acid number, and so on.

If desired, the polymerization may be carried out in the presence of one or more esterification catalysts as mentioned above. Suitable catalysts may also include those disclosed in U.S. Pat. Nos. 4,025,492, 4,136,089, 4,176,224, 4,238,593, and 4,208,527, which are hereby incorporated herein by reference. Suitable catalyst systems may include compounds of Ti, Ti/P, Mn/Ti/Co/P, Mn/Ti/P, Zn/Ti/Co/P, Zn/Al, Sb (e.g., $Sb_2O_3$), Sn (e.g., dibutyltin oxide, dibutyltin dilaurate, n-butyltin trioctoate) and so on. When cobalt is not used in the polycondensation, copolymerizable toners may be incorporated into the copolyesters to control the color of these copolyesters so that they are suitable for the intended applications where color may be an important property. In addition to the catalysts and toners, other additives, such as antioxidants, dyes, etc. may be used during the copolyesterification, or may be added after formation of the polymer.

The polymerization may optionally include a solid state polymerization (SSP) stage, following the melt phase, under conditions effective to increase the molecular weight. SSP may comprise grinding or pelletizing the solid polymer (after cooling) following the melt phase polymerization, optionally annealing the ground or pelletized polymer, and heating the ground polymer to polymerization temperature. If used, the annealing temperature is preferably above 100° C., or above 120° C., or above 140° C., e.g., about 160° C. The SSP reaction temperature is preferably greater than 200° C., e.g., 210-220° C., under vacuum or a stream of dry nitrogen (or other chemically-inert gas) for a sufficient period of time to increase the molecular weight, preferably increasing the inherent viscosity by at least 10%, or at least 20%, or at least 30%, or at least 40%, or at least 50%.

In any embodiment, the copolyesters may include conventional additives including pigments, colorants, stabilizers, antioxidants, extrusion aids, reheat agents, slip agents, carbon black, flame retardants and mixtures thereof. In any embodiment, the copolyester may be combined or blended with one or more modifiers and/or blend polymers including polyamides; e.g., NYLON 6,6® (DuPont), poly(ether-imides), polyphenylene oxides, e.g., poly(2,6-dimethylphenylene oxide), poly(phenylene oxide)/polystyrene blends; e.g., NORYL® (GE), other polyesters, polyphenylene sulfides, polyphenylene sulfide/sulfones, poly(ester-carbonates), polycarbonates; e.g., Lexan® (GE), polysulfones, polysulfone ethers, poly(ether-ketones), combinations thereof, and the like.

Any of the composites described herein may be melt processed, e.g., for the preparation of molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. The molding process is preferably injection molding, including gas-assisted injection molding. Accordingly, in any embodiment, composites according to the instant invention can be molded and extruded using conventional melt processing techniques to produce a shaped article. The shaped articles manufactured from the copolyesters in any embodiment disclosed herein exhibit improved properties as shown in the examples below.

In any embodiment according to the present invention, the viscosity, crystallization characteristics, and/or mechanical properties, can be controlled by selecting the amount of the fiber employed. Preferably, the fiber loading is increased at a low level (up to 10 or 20 wt %) to reduce the melt viscosity, increase heat deflection temperature, increase stiffness, and/or increase strength. Higher fiber loading is preferably employed for further increasing stiffness and/or strength.

This invention also relates to:
1. A fiber-reinforced plastic composition, comprising a polyester comprising:
    a. a diol component comprising an alkylene glycol; and
    b. a diacid component comprising terephthalate and 4,4'-biphenyl dicarboxylate; and
    c. a fiber reinforcing agent.
2. The composition of paragraph 1, wherein the diol component comprises ethylene glycol.
3. The composition of any one of paragraphs 1-2, wherein the diacid component comprises from 10 to 90 mole percent terephthalate and from 90 to 10 mole percent 4,4'-biphenyldicarboxylate.
4. The composition of any one of paragraphs 1-3, wherein the diacid component further comprises another diacid or ester producing equivalent thereof, wherein the other diacid or ester producing equivalent thereof is present in an amount less than 10 mole percent, based on the total moles in the diacid component.
5. The composition of any of paragraphs 1-4, wherein the fiber reinforcing agent is selected from carbon fiber, glass fiber, amorphous silica, asbestos, calcium silicate (preferably wollastonite), aluminum silicate, magnesium carbonate, kaolin, chalk, quartz, mica and feldspar.
6. The composition of any one of paragraphs 1-5, wherein the fiber reinforcing agent comprises glass fiber.
7. The composition of any one of paragraphs 1-6, wherein the fiber reinforcing agent is present in a proportion of from 0.1 to 60 percent by weight of the composition.
8. The composition of any one of paragraphs 1-7, wherein the fiber reinforcing agent comprises short fibers having an aspect ratio greater than 6 and less than 1000.
9. The composition of any one of paragraphs 1-8, wherein the fiber reinforcing agent comprises long fibers having an aspect ratio greater than 1000.
10. The composition of any one of paragraphs 1-8, wherein the polyester comprises a frustrated liquid crystalline polymer.
11. A method for molding a fiber-reinforced polyester, comprising melt processing a polyester composition comprising
    a. a diol component comprising an alkylene glycol; and
    b. a diacid component comprising terephthalate and 4,4'-biphenyl dicarboxylate; and
    c. a fiber reinforcing agent; and forming the resulting composite in the shape of a mold.
12. The method of paragraph 11, wherein the diol component comprises ethylene glycol.
13. The method of any one of paragraph 11-12, wherein the diacid component comprises 10 to 90 mole percent terephthalate and from 90 to 10 mole percent 4,4'-biphenyldicarboxylate.
14. The method of any one of paragraph 11-13, comprising injection molding.
15. The method of any one of paragraphs 11-14, comprising removing the shaped polyester from the mold.
16. The method of any one of paragraphs 11-15, further comprising adjusting the proportion of the fiber reinforcing agent to control the melt viscosity, crystallization characteristics, and/or mechanical properties.
17. A method to control the viscosity, crystallization characteristics, and/or mechanical properties of a copolyester, comprising melt processing a polyester composition comprising:
    a. a diol component comprising an alkylene glycol; and
    b. a diacid component comprising terephthalate and 4,4'-biphenyl dicarboxylate; and
    c. a fiber reinforcing agent;
    forming the resulting composite in the shape of a mold; selecting a proportion of the fiber reinforcing agent to adjust the viscosity, crystallization characteristics, and/or mechanical properties of the composite.
18. The composite produced according to any one of the methods of paragraphs 11-17.

Examples

PETBB55 Synthesis: Poly(ethylene terephthalate-co-4,4'bibenzoate) nominally containing 55 mole percent 4,4'-bibenzoate in the diacid component (PETBB55) was synthesized by transesterification and condensation polymerization procedure in a customized stainless steel reactor from diacid esters and ethylene glycol. The molar ratio of dimethyl terephthalate and dimethyl 4,4'-bibenzoate was 45:55. Titanium (IV) butoxide was added at 40 ppm as catalyst. The PETBB55 was otherwise synthesized as described in Schiraldi, et al., Mechanical Properties and Atomic Force Microscopic Cross Sectional Analysis of Injection Molded Poly(Ethylene Terephthalate-Co-4,4'-Bibenzoate), J. Ind. Eng. Chem. 2001, 7 (2), 67-71 ("Schiraldi"). The resulting PETBB55 had an inherent viscosity (IV) of 0.7 dL/g. To obtain higher molecular weight, solid state polymerization (SSP) was applied to the synthesis reactor product in a vacuum oven. The PETBB55 was ground and placed in an oven and annealed overnight at 160° C. The oven temperature was then increased to 210-220° C., and vacuum applied for 48 hours. When SSP was finished, the oven temperature was decreased to room temperature before removing the product. Following SSP, the IV of the PETBB55 had increased to ~1.18 dL/g. The higher molecular weight material was used in the following procedures.

Compounding PETBB55 with Glass Fiber: Short chopped glass fiber (GF) from Owens Corning (CS 272-13P 4 mm 2406 #GBB) was used. This E type GF was used because of its known compatibility with polybutylene terephthalate (PBT) and corrosion resistance. The length of the GF was 4 mm, and the diameter around 10-13 m. The high molecular weight PETBB55 resin following SSP and the GF were dried in a vacuum oven at 80° C. overnight to remove moisture before compounding. PETBB55 and GF composites were extruded in a Thermo Fisher Scientific EuroLab 16 XL twin screw extruder. The loading ratios (weight percentage) of GF were 10 wt % and 30 wt %, based on the total weight of the composite. PET (DAK Laser+ C 9921) was also blended with the GF at ratios of 0, 10 wt %, and 30 wt %, for comparison. The processing temperature for all groups was 285° C. Extruded strips were quenched in a water bath, pelletized, and dried.

Injection Molding: The dried pelletized samples (PET, PET/10% GF, PET/30% GF, PETBB55, PETBB55/10% GF, and PETBB55/30% GF) were injection molded in a Boy 22-S molding machine. Extrusion temperatures, mold temperatures, and cycle times are listed in Table 1, as follows:

TABLE 1

Extrusion and molding conditions.

| Sample | Front Zone T (° C.) | Mid Zone T (° C.) | End Zone T (° C.) | Molding T (° F.) | Cycle Time (s) |
|---|---|---|---|---|---|
| PET | 275 | 280 | 285 | 26.7 | 50 |
| PET/10% GF | 275 | 280 | 285 | 26.7 | 50 |
| PET/30% GF | 275 | 280 | 285 | 26.7 | 50 |
| PETBB55 | 290 | 295 | 300 | 71.1 | 25 |
| PETBB55/10% GF | 275 | 280 | 285 | 71.1 | 25 |
| PETBB55/30% GF | 290 | 295 | 300 | 71.1 | 25 |

Melt Rheology: Rheological properties were studied using an ARES 2 Rheometer with 25 mm diameter parallel plates at 285° C. The thickness of compressed samples was around 0.9-1.1 mm. Dynamic strain sweep tests were run at 6.28 rad/s to confirm the linear region. Dynamic frequency sweep tests were then run over a frequency range of 0.1-100 rad/s. The 10% strain was applied for the PET, PET/10% GF, PETBB55, and PETBB55/10% GF samples, and 0.4% strain was applied for the PET/30% GF and PETBB55/30% GF samples.

Figure 2:
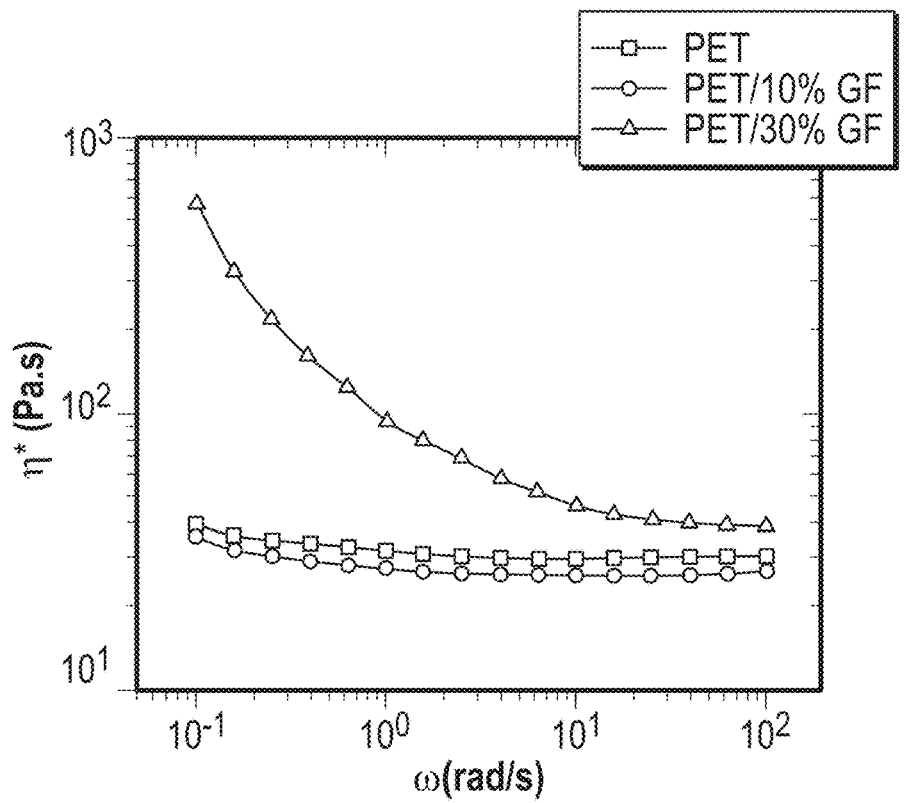
FIG. 2 is a graph of the complex viscosity ($\eta^*$) of the PET and fiber reinforced PET of FIG. 1.
Figure 3:
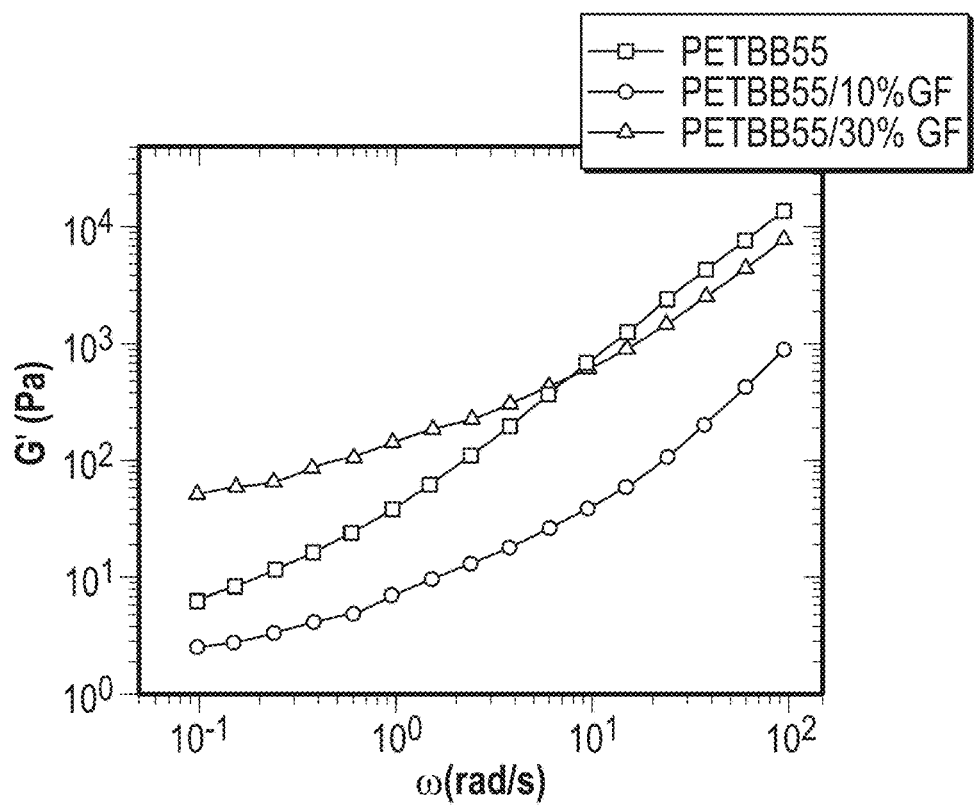
FIG. 3 is a graph of the storage modulus (G') of poly (ethylene terephthalate-co-4,4'-biphenyl dicarboxylate) (PETBB) and fiber reinforced PETBB. In any embodiment of the invention and a comparison.
Figure 4:
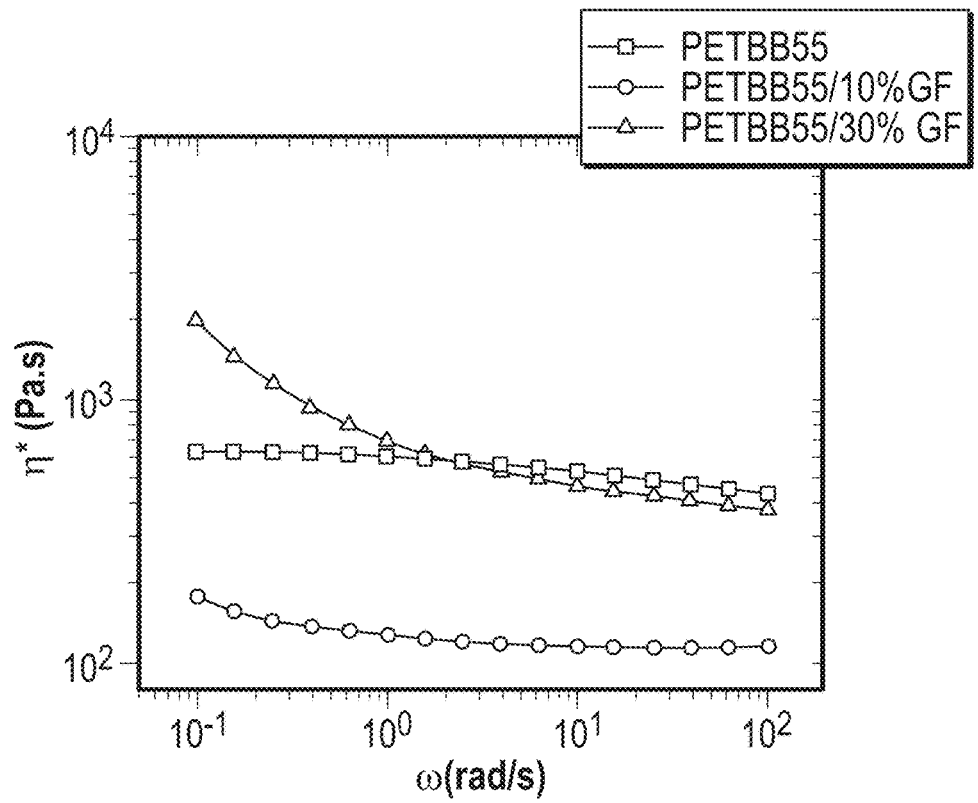
FIG. 4 is a graph of the complex viscosity ($\eta^*$) of PETBB and fiber reinforced PETBB of FIG. 3. In any embodiment of the invention and a comparison.

As seen in FIGS. 1-2, the storage modulus and complex viscosity of the PET were very similar at low GF loading, but markedly increased at 30% GF. In contrast, as seen in FIGS. 3-4, the storage modulus and complex viscosity of the PETBB55 at low GF loading were substantially lower than those of the PETBB55 matrix alone, as well as at high GF loading. While it is to be expected that the storage modulus and complex viscosity would increase at high loading, as seen in the PETBB55/30% GF, it was unexpected that the PETBB55/10% GF would have such unusually low viscosity compared to the PETBB55 matrix. When injection molding PETBB55 matrix and PETBB55/30% GF composite, higher processing temperature (15° C. higher, see Table 1) and higher pressure relative to PET and PET/GF composites had to be applied to completely fill the injection molded bars. At lower temperatures or pressures, the tip of bars would not be completely filled as a result of the relatively higher viscosity and low mobility of the melt. However, as seen in Table 1, the PETBB55/10% GF composite could be injection molded with decent bars at the same PET injection molding temperature and pressure. This observation facilitates processing high viscosity PETBB55 using a low ratio of glass fiber by the injection molding machine, at the standard processing conditions used for PET and PET/GF, using existing setups for injection molding PET and PBT. Moreover, the rheological properties of PETBB55/10% GF and similar composites facilitates injection molding of parts having thin walls, as well as thin films.

This phenomenon is consistent with a system in which a small amount of glass fiber could encourage frustrated liquid crystalline PETBB55 molecules to align in an orderly manner in the presence of an applied force. Moreover, internal slip in the presence of glass fiber would be consistent with the 4,4'-bibenzoates behaving as rigid rods in the polymer chains.

Thermal properties: Thermal characterizations of polymer matrices and the GF composites were carried by differential scanning calorimetry (DSC) on a TA Q2000 scanning calorimeter at a scan rate of 10° C./min, second heating curve. The degradation temperature ($T_d$), defined as 5% weight loss, was measured by TA Q500 thermogravimetric analyzer. The results are presented in Table 2, as follows:

TABLE 2

Thermal properties of extruded PET and PETBB55 resins and composites.

| Sample | $T_g$ (° C.) | $T_m$ (° C.) | $\Delta H_m$ (J·g$^{-1}$) | $T_c$ (° C.) | $T_d$ (° C.) | $T_i$ (° C.) |
|---|---|---|---|---|---|---|
| PET | 82 | 240 | 30 | 158 | 374 | ND |
| PET/10% GF | 80 | 243 | 29 | 180 | | |
| PET/30% GF | 83 | 244 | 23 | 185 | | |
| PETBB55 | 105 | 250 | 12 | 200 | 375 | ND |
| PETBB55/10% GF | 102 | 250 | 10 | 210 | | |
| PETBB55/30% GF | 105 | 246 | 5 | 202 | | |

ND = Not detected

As seen in Table 2, even though the PETBB55 does not have an isotropic temperature as do liquid crystal polymers, when it goes through solid to melt transition, the heat capacity of PETBB55 is relatively small like a liquid crystal polymer, in comparison to semi-crystalline polymers such as PET. In liquid crystalline polymers, such phenomenon is largely explained by the highly oriented structure of the polymer in both of the solid and melt states differentiated by minimal changes and movements in the structures that require less energy for these transitions than do semi-crystalline polymers. The behavior of PETBB55 is consistent with a frustrated liquid crystal polymer in which the BB introduces rigid rods into the molecular backbone to stiffen the polymer molecule. Even though PET and PETBB55 have similar melting temperatures, the crystalline temperature of PETBB55 is more than 40° C. higher than that of PET. Consequently, PETBB55 needs less supercooling for crystallization, indicated by the delta $T_m$-$T_c$. Compared to PET, the smaller heat capacity and supercooling for PETBB55 indicate that less energy is needed for melting or crystallization, leading to less energy being required for processing, shorter cycle time and higher efficiency for injection molding.

The melting temperatures of the GF composites were essentially the same as the polymer matrices; however, the crystallization temperatures of PETBB55/GF composites were 30° C. higher than PET. Based on these results, the PET composites were injection molded at the same temperature as the extrusion. Due to the higher viscosity of PETBB55 and PETBB55/30% GF groups, the injection molding processing temperature for these two groups increased 15° C. PETBB55/10% GF group used the same processing temperature as extrusion. The thermal properties of the injection molded bars are listed in Table 3, as follows:

TABLE 3

Thermal properties of injection molded bars.

| Sample | $T_g$ (° C.) | $T_{cc}$ (° C.) | $T_m$ (° C.) | $\Delta H_{cc}$ (J-g$^{-1}$) | $\Delta H_m$ (J-g$^{-1}$) | $\Delta H_m$ – $\Delta H_{cc}$ (J-g$^{-1}$) |
|---|---|---|---|---|---|---|
| PET | 78 | 138 | 245 | 25 | 33 | 8 |
| PET/10% GF | 78 | 128 | 248 | 22 | 34 | 12 |
| PET/30% GF | 78 | 130 | 248 | 16 | 25 | 9 |
| PETBB55 | 102 | — | 250 | 0 | 21 | 21 |
| PETBB55/10% GF | 104 | 116 | 250 | 1 | 18 | 17 |
| PETBB55/30% GF | 104 | 115 | 250 | 0.6 | 12 | 11 |

For PET specimens, there was an obvious cold crystallization peak at 128-137° C., which indicated that PET was not fully crystallized during processing. The initial crystallinity for all injection molded bars of PET groups was less than 10%, based on the assumption the $\Delta H_m$ of 100% crystalline PET is 118 J/g. The injection molded PET bars were transparent, and the polymer had an amorphous morphology. For PETBB specimens, the DSC sample was cut from the surface of a middle part of straight bars. There was a very small cold crystallization peak, which started just above glass transition, suggesting a small portion of the polymer may have been quenched by initial contact with the cold mold wall. The injection molded bars for PETBB55 specimens were opaque.

Scanning Electron Microscopy: Scanning electron microscopy (SEM) images (not shown) were obtained using an FEI Helios Nanolab 650. The specimens for SEM were extruded string fracture by liquid nitrogen. The SEM's confirmed the glass fiber was aligned with the extrusion direction in both PET and PETBB55 matrices, and the glass fiber was more packed at 30 wt % loading ratio than in the 10 wt % loading ratio.

Figure 5:
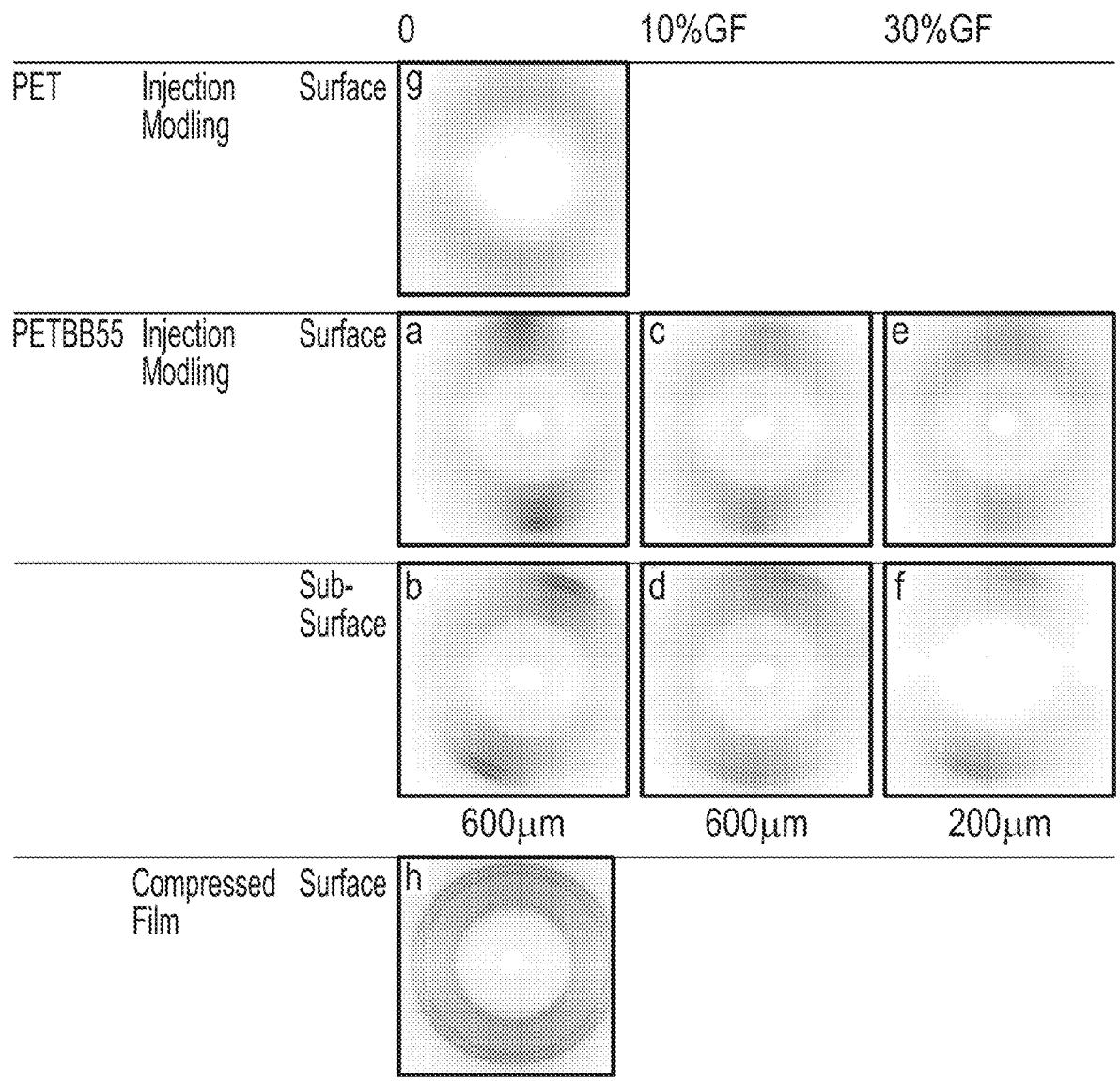
FIG. 5 is a chart showing the 2D X-ray reflection images of PET and PETBB at various surface depths, with and without fiber reinforcement. In any embodiment of the invention and comparisons.

2D-wide angle X-ray scattering: The PETBB injection molding dog-bone specimens were observed to have skin layers as are normally seen in liquid crystalline polymers, especially for PETBB55 and PETBB55/10GF groups. Skin layers having a thickness of around 200 m were seen in specimens which had a total thickness of 3.3 mm. Thin layers were selected from different locations of the samples, and their 2D WAXS patterns were collected with a rotating anode X-ray generator (Rigaku, Woodlands, Tex.) with a beam of monochromatic Cu Kα radiation (X=0.154 nm). The X-ray generator was operated at 45 kV and 0.88 mA. Selected 2D X-ray reflection images are shown in FIG. 5.

The scattering angles of PETBB55 and PETBB55/10GF samples from the surface layer were smaller than from deeper layer, which indicates the higher orientation of polymer crystals. On the other hand, the PETBB55/30GF sample from the surface did not have such sharp reflection, which is consistent with a higher concentration of glass fiber at the surface. PET/10GF only had a halo ring, which is consistent with an absence of any molecular orientation. The molecular orientation seen in the PETBB55 samples suggests these materials have superior mechanical properties relative to conventional polymers.

Glass fiber orientation in injection molded parts can be influenced greatly by the flow direction. In general, the orientation of short glass fiber is highly sensitive to elongational flow. In the direction of flow, the orientation is maximum at surface due to the fountain flow effect. However, the degree of orientation of glass fiber is very different from edge to center. For most glass fiber filled molded parts, the core is more transversely oriented, and the edge is more longitudinally oriented. Micro-CT images (not shown) of the cross section of injection molding dog-bone bars confirmed that most glass fiber is oriented with the flow direction. The presence of glass fiber located transversely in the images decreased from PET/10GF to PETBB55/10GF, and decreased further in the PETBB55/30GF specimen, which had the smallest percentage glass fiber not following flow direction. The orientation of the glass fiber in PETBB55 in this manner is consistent with behavior of a liquid crystal polymer during injection molding, rather than traditional engineering plastics such as PET.

Tensile testing: Injection molded dog-bone shaped bars (5-7 individual bars for each group) were used for tensile testing, which was done on an MTS test system with 5 kN load cell, based on the ASTM D412 standard. The crosshead speed was 50 mm/min. Some selected mechanical data from the tensile testing are presented in Table 4 as follows:

TABLE 4

Mechanical properties from tensile testing.

| Sample | Tensile modulus (MPa) | Strength at yield (MPa) | Strain at yield (%) | Strength at break (MPa) | Strain at break (%) | Ultimate strength (MPa) |
|---|---|---|---|---|---|---|
| PET | 1150 ± 90 | 57 ± 2 | 7.7 ± 3 | 35 ± 5 | 400 ± 30 | 57 ± 2 |
| PET/10% GF | 1900 ± 50 | | | 63 ± 2 | 4.4 ± 0.3 | 63 ± 2 |
| PET/30% GF | 2900 ± 200 | 104 ± 1 | 6.7 ± 0.4 | 94 ± 1 | 9.7 ± 0.8 | 104 ± 1 |
| PETBB55 | 1600 ± 100 | | | 80 ± 9 | 10.1 ± 0.7 | 80 ± 9 |

TABLE 4-continued

Mechanical properties from tensile testing.

| Sample | Tensile modulus (MPa) | Strength at yield (MPa) | Strain at yield (%) | Strength at break (MPa) | Strain at break (%) | Ultimate strength (MPa) |
|---|---|---|---|---|---|---|
| PETBB55/ 10% GF | 2500 ± 200 | | | 85 ± 1 | 5.6 ± 0.8 | 85 ± 1 |
| PETBB55/ 30% GF | 4100 ± 200 | | | 110 ± 5 | 6.6 ± 0.5 | 110 ± 5 |

As seen, PET had typical polymer flexibility for cold drawing capability and large plastic deformation above 400% elongation. The PETBB55 injection molded bars exhibited brittleness, and compared to PET, they had higher stiffness and higher strength, but much lower strain. This behavior is consistent with contributions originating from (1) the relative rigidity and stiffness of the PETBB55 molecule, e.g., the glass transition temperature of PETBB55 is around 30° C. higher than PET; and (2) the pseudo-liquid crystalline nature of PETBB55, which can orient the molecules in the flow direction during processing. Note the tensile stretching direction is roughly parallel with the injection molding flow direction.

Glass fiber reinforced composite materials had higher stiffness and strength in both groups compared to the respective polymer matrices. Higher loading ratios of glass fiber showed higher modulus and tensile strength for the composite materials, consistent with transfer by shear stress of the load from the weaker polymer material to the relatively stronger glass fiber, and with the orientation of the glass fiber mainly parallel to the flow and tensile force directions, increasing stiffness and strength.

Flexural testing: Injection molded straight bars were used for flexural testing. The flexural test was performed according to ASTM D790 on an MTS test system with 1 kN load cell. The span was 50 mm, crosshead speed was 1.27 mm/minute (0.05 in./min), and strain limit was 5%. Some selected mechanical data from the flexural testing are presented in Table 5, as follows:

TABLE 5

Mechanical properties from flexural testing.

| Sample | Tensile modulus (MPa) | Strength at yield (MPa) | Strain at yield (%) | Strength at break (MPa) | Strain at break (%) | At 5% strain limit |
|---|---|---|---|---|---|---|
| PET | 2510 ± 30 | 57 ± 2 | 4.64 ± 0.01 | 83 ± 1 | >5 | No break |
| PET/10% GF | 3730 ± 30 | | | 95 ± 6 | 3.0 ± 0.4 | |
| PET/30% GF | 7900 ± 100 | 104 ± 1 | 3.3 ± 0.3 | 137 ± 7 | 4.6 ± 0.1 | |
| PETBB55 | 3000 ± 400 | | | 80 ± 8 | >5 | No break |
| PETBB55/ 10% GF | 5200 ± 400 | | | 111 ± 3 | 3.5 ± 0.6 | |
| PETBB55/ 30% GF | 9400 ± 300 | | | 150 ± 8 | 2.5 ± 0.1 | |

The flexural mechanical data showed the PETBB55 specimens had higher stiffness and strength compared to the PET counterparts, but otherwise analogous to the tensile data. In the flexural testing, these results are consistent with a self-reinforcing effect from molecular orientation and with contributions by the glass fiber loading.

Figure 6:
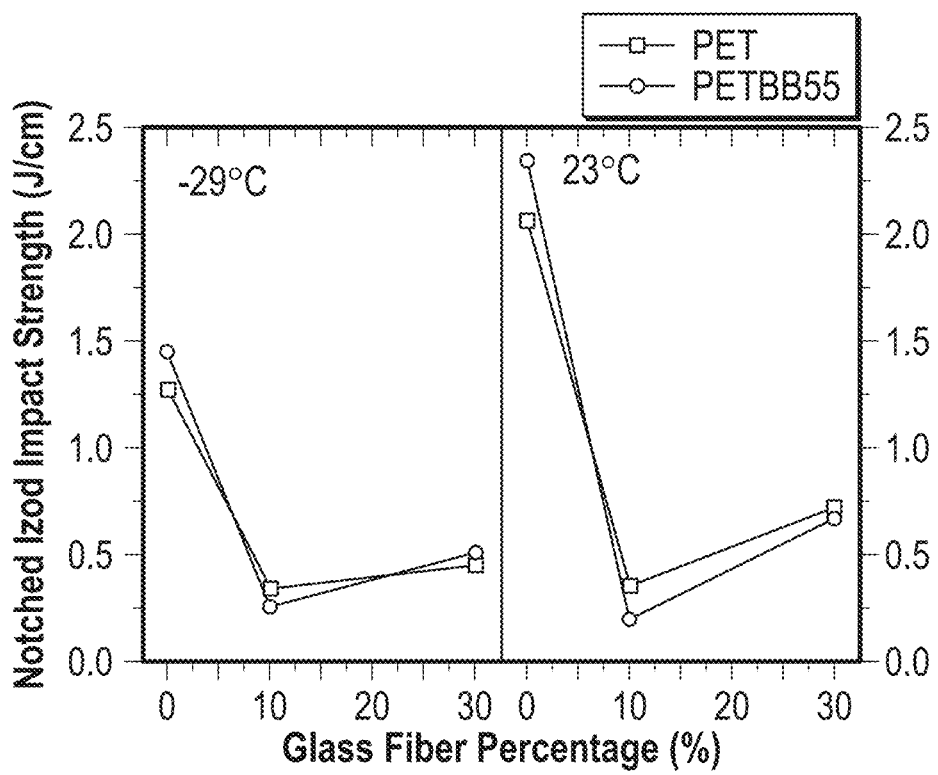
FIG. 6 is a graph of the impact strength of injection molded bars versus fiber loading for PET, PETBB, and composites at −29° C. and +23° C. In any embodiment of the invention and comparisons.

Notched Izod impact testing: The injection molded straight bars were used for notched Izod impact testing (ASTM D256) at −29° C. and +23° C. The results are shown in FIG. 6. For the polymer matrices, PETBB55 had slightly higher impact strength than PET at both temperatures, consistent with alignment of the PETBB55 molecules and formation of a wood-like fibrous structure oriented perpendicularly to the impact direction. Bars without glass fiber reinforcing unexpectedly had much higher impact strength than the reinforced composites, contrary to the increase in impact strength that is normally seen by adding GF to conventional polymers. This suggests the adhesion or bonding between the glass fibers and polymer the matrix is weak.

Figure 7:
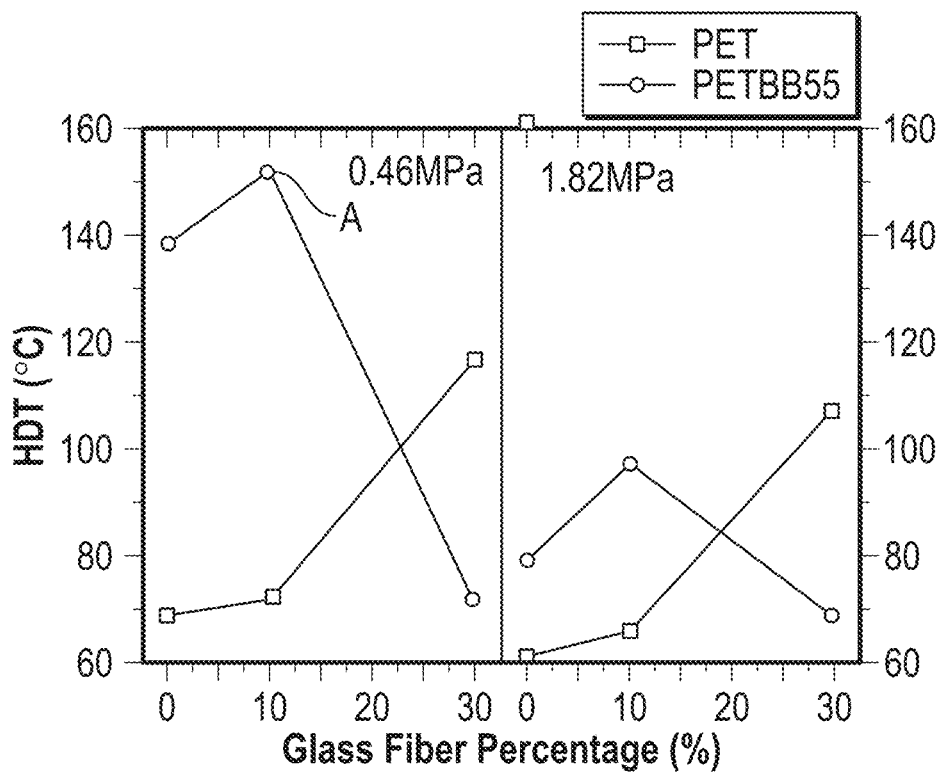
FIG. 7 is a graph of the heat deflection temperature of injection molded bars versus fiber loading for PET, PETBB, and composites at 0.46 MPa and 1.82 MPa. In any embodiment of the invention and comparisons.

Heat Deflection Temperature: The injection molded straight bars were used for Heat Deflection Temperature (HDT) testing (ASTM D648) at 0.46 MPa and 1.82 MPa. The results are seen in FIG. 7. Normally, glass fiber reinforcement should have a higher HDT than the unreinforced matrix, but the HDT of the PETBB55 composites unexpectedly decreased when the fiber loading was increased from 10 wt % to 30 wt %. Moreover, the PETBB55 matrix and 10 wt % GF specimens had a substantially higher HDT than the corresponding PET matrix and 10 wt % GF specimens. The PETBB55/10GF specimen unexpectedly had an HDT at 0.46 MPa that was above the testing machine limit, i.e., >165° C.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims.

The invention claimed is:

1. A fiber-reinforced plastic composition, comprising a polyester comprising:
   a) a diol component comprising an alkylene glycol; and
   b) a diacid component comprising terephthalate and 4,4'-biphenyl dicarboxylate; and
   c) a fiber reinforcing agent, wherein the fiber reinforcing agent is present in a proportion of from 10 to 30 percent by weight of the composition; and wherein the polyester alone comprises a frustrated liquid crystalline polymer.

2. The composition of claim 1, wherein the diol component comprises ethylene glycol.

3. The composition of claim 1, wherein the diacid component comprises from 10 to 90 mole percent terephthalate and from 90 to 10 mole percent 4,4'-biphenyldicarboxylate.

4. The composition of claim 1, wherein the diacid component further comprises another diacid or ester producing equivalent thereof, wherein the other diacid or ester producing equivalent thereof is present in an amount less than 10 mole percent, based on the total moles in the diacid component.

5. The composition of claim 1, wherein the fiber reinforcing agent is selected from carbon fiber, glass fiber, amorphous silica, asbestos, calcium silicate, aluminum silicate, magnesium carbonate, kaolin, chalk, quartz, mica, and feldspar.

6. The composition of claim 1, wherein the fiber reinforcing agent comprises glass fiber.

7. The composition of claim 1, wherein the fiber reinforcing agent comprises short fibers having an aspect ratio greater than 6 and less than 1000.

8. The composition of claim 1, wherein the fiber reinforcing agent comprises long fibers having an aspect ratio greater than 1000.

9. The composition of claim 1, wherein the fiber-reinforced plastic composition has a reduced melt viscosity relative to the polyester alone.

10. The composition of claim 1, comprising a lower enthalpy of melting relative to the polyester alone, the same or lower melting temperature relative to the polyester alone, a higher heat distortion temperature under a specified load of 455 kPa relative to the polyester alone, and/or a heat of cold crystallization equal to or less than 1 J/g.

11. The composition of claim 1, wherein the diacid component comprises from 25 to 65 mole percent terephthalate and from 75 to 35 mole percent 4,4'-biphenyl dicarboxylate.

12. A method for molding a fiber-reinforced polyester, comprising melt processing a polyester composition comprising:
a) a diol component comprising an alkylene glycol; and
b) a diacid component comprising terephthalate and 4,4'-biphenyl dicarboxylate; and
c) a fiber reinforcing agent, wherein the fiber reinforcing agent is present in a proportion of from 10 to 30 percent by weight of the composition;
wherein the polyester alone comprises a frustrated liquid crystalline polymer; and
wherein the polyester composition has a reduced melt viscosity relative to the polyester alone; and
forming the resulting composite in the shape of a mold.

13. The method of claim 12, wherein the diol component comprises ethylene glycol.

14. The method of claim 12, wherein the diacid component comprises 10 to 90 mole percent terephthalate and from 90 to 10 mole percent 4,4'-biphenyldicarboxylate.

15. The method of claim 12, comprising injection molding.

16. The method of claim 12, comprising removing the shaped polyester from the mold.

17. The method of claim 12, further comprising adjusting the proportion of the fiber reinforcing agent to control the melt viscosity, crystallization characteristics, and/or mechanical properties.

18. The composition produced according to claim 12.

19. A method to control the viscosity, crystallization characteristics, and/or mechanical properties of a copolyester, comprising:
melt processing a polyester composition comprising:
a) a diol component comprising an alkylene glycol; and
b) a diacid component comprising terephthalate and 4,4'-biphenyl dicarboxylate; and
c) a fiber reinforcing agent;
wherein the polyester alone comprises a frustrated liquid crystalline polymer;
forming the resulting composite in the shape of a mold; and
selecting a proportion of the fiber reinforcing agent to adjust the viscosity, crystallization characteristics, and/or mechanical properties of the composite, wherein the proportion of the fiber reinforcing agent is from 10 to 30 percent by weight of the polyester composition.

20. The composition produced according to the method of claim 19.

21. A fiber-reinforced plastic composition, comprising a polyester comprising:
a) a diol component comprising an alkylene glycol; and
b) a diacid component comprising terephthalate and 4,4'-biphenyl dicarboxylate; and
c) a fiber reinforcing agent, wherein the fiber reinforcing agent is present in a proportion of from 10 to 30 percent by weight of the composition;
wherein the diol component comprises ethylene glycol;
wherein the diacid component comprises from 10 to 90 mole percent terephthalate and from 90 to 10 mole percent 4,4'-biphenyl dicarboxylate;
wherein the fiber reinforcing agent is selected from carbon fiber, glass fiber, amorphous silica, asbestos, calcium silicate, aluminum silicate, magnesium carbonate, kaolin, chalk, quartz, mica and feldspar;
wherein the fiber reinforcing agent is present in a proportion of from 0.1 to 60 percent by weight of the composition; and
wherein the fiber reinforcing agent comprises short fibers having an aspect ratio greater than 6 and less than 1000; and
wherein the polyester alone comprises a frustrated liquid crystalline polymer.

22. A fiber-reinforced plastic composition, comprising a polyester comprising:
a) a diol component comprising an alkylene glycol; and
b) a diacid component comprising terephthalate and 4,4'-biphenyl dicarboxylate; and
c) a fiber reinforcing agent, wherein the fiber reinforcing agent is present in a proportion of from 10 to 30 percent by weight of the composition;
wherein the diol component comprises ethylene glycol;
wherein the diacid component comprises from 10 to 90 mole percent terephthalate and from 90 to 10 mole percent 4,4'-biphenyl dicarboxylate;
wherein the fiber reinforcing agent is selected from carbon fiber, glass fiber, amorphous silica, asbestos, calcium silicate, aluminum silicate, magnesium carbonate, kaolin, chalk, quartz, mica and feldspar;
wherein the polyester alone comprises a frustrated liquid crystalline polymer; and
wherein the fiber reinforcing agent comprises long fibers having an aspect ratio greater than 1000.

23. A fiber-reinforced plastic composition, comprising a polyester comprising:
- a) a diol component comprising an alkylene glycol; and
- b) a diacid component comprising terephthalate and 4,4'-biphenyl dicarboxylate; and
- c) a fiber reinforcing agent, wherein the fiber reinforcing agent is present in a proportion wherein the diol component comprises ethylene glycol;
- wherein the diacid component comprises from 10 to 90 mole percent terephthalate and from 90 to 10 mole percent 4,4'-biphenyl dicarboxylate;
- wherein the diacid component further comprises another diacid or ester producing equivalent thereof, wherein the other diacid or ester producing equivalent thereof is present in an amount less than 10 mole percent, based on the total moles in the diacid component;
- wherein the fiber reinforcing agent is selected from carbon fiber, glass fiber, amorphous silica, asbestos, calcium silicate, aluminum silicate, magnesium carbonate, kaolin, chalk, quartz, mica and feldspar;
- wherein the fiber reinforcing agent comprises short fibers having an aspect ratio greater than 6 and less than 1000;
- wherein the polyester alone comprises a frustrated liquid crystalline polymer; and
- wherein the fiber reinforcing agent comprises long fibers having an aspect ratio greater than 1000.

* * * * *